United States Patent [19]
Usami et al.

[11] Patent Number: 5,363,480
[45] Date of Patent: Nov. 8, 1994

[54] LAYOUT DISPLAY CONTROL SYSTEM FOR DOCUMENT PROCESSING APPARATUS

[75] Inventors: Yuri Usami; Chiharu Hori, both of Nagoya; Misao Kataoka, Mie; Manami Yamada, Seto; Kayoko Harada, Nagoya, all of Japan

[73] Assignee: Brother Kogyo Kabushiki Kaisha, Nagoya, Japan

[21] Appl. No.: 650,235

[22] Filed: Feb. 4, 1991

[30] Foreign Application Priority Data

Feb. 2, 1990 [JP] Japan .................... 2-24905

[51] Int. Cl.⁵ ............................ G06F 15/62
[52] U.S. Cl. ........................ 395/145; 364/419.1
[58] Field of Search ............. 395/117, 145, 148, 153; 364/419, 419.01–419.19, 419.20

[56] References Cited

U.S. PATENT DOCUMENTS

| | | | |
|---|---|---|---|
| 4,451,900 | 5/1984 | Mayer et al. | 395/145 |
| 4,661,000 | 4/1987 | Shinbori | 395/117 |
| 4,802,104 | 1/1989 | Ogiso | 395/145 |
| 4,897,804 | 1/1990 | Kawakami et al. | 395/145 |
| 4,949,287 | 8/1990 | Yamaguchi et al. | 395/148 |
| 4,951,223 | 8/1990 | Fujiwara et al. | 364/507 |
| 5,001,654 | 3/1991 | Winiger et al. | 395/148 |
| 5,029,114 | 7/1991 | Makiguchi | 395/145 |
| 5,151,975 | 9/1992 | Shiraki et al. | 395/148 |

FOREIGN PATENT DOCUMENTS 58-200326  11/1983  Japan .

OTHER PUBLICATIONS

Alfieri, "The Best Book of: Word Perfect Version 5.0", Hayden Books (1987) (1988), pp. 4, 27, 34–35, 93–131, and 219–223.

Miller, "PC Desktop Publisher Bridges the Gap Between High and Low End Programs", InfoWorld vol. 9 No. 42 (Oct. 1987), p. 71 Abstract Only.

IBM Technical Disclosure Bulletin, "Multi-Page Document Display", T. W. Ringle & M. S. Van Dyke, vol. 23, No. 8, pp. 3794–3795; Jan. 1981.

Primary Examiner—Mark K. Zimmerman
Assistant Examiner—N. Kenneth Burraston
Attorney, Agent, or Firm—Oliff & Berridge

[57] ABSTRACT

A document processing apparatus, such as English word processor, displays layouts of several pages of the documents on page basis in the respective rectangular layout display areas on a display together with format information including top margin, bottom margin, print line numbers in each page of the documents. When the layout display mode is selected, at least the layout of the page of the documents pointed out by a cursor when the document data has been displayed is displayed on one part of the display and the associated format information is displayed on another part of the display by, for example, line numbers.

13 Claims, 6 Drawing Sheets

LAYOUT DISPLAY CONTROL SYSTEM FOR DOCUMENT PROCESSING APPARATUS

BACKGROUND OF THE INVENTION

The present invention relates to a layout display control system for a document processing apparatus, and more particularly to a layout display control system which simultaneously displays the layout of document data and format information therefor.

English word processors generally have a display for displaying a plurality of lines and also incorporate many functions to facilitate inputting and editing document data. Particularly, some word processors which have become available recently have a document layout display function for displaying the arrangements of characters of document data for each page in the form of arrangements of dots or line segments upon converting each line of the characters to dot trains or a line segment.

To display the layout of the document data using the layout display function, a "layout" key is pressed to select a layout display mode and erase the document data having been displayed on a display. Thereafter, a rectangular layout display area indicative of a printing area appears in the display on the basis of format information regarding a printing format that has been inputted in advance in association with the document data, and then the layout of the page of the document pointed out by a cursor is displayed in the layout display area. The format information includes such items as "top margin" to be reserved from the upper edge of a sheet of print paper to a print start position of the document data, "print line numbers" to be included in each page, "bottom margin" to be reserved from the last print position in each page to the lower edge of the sheet of print paper, and other line directional items. Each item is represented by the number of lines or numerals.

The layout of a next page of document data or the layout of a previous page of document data is individually displayed when a "next page" key or a "previous page" key is pressed.

In the above-described word processors having a layout display function in which the layout of the document data is displayed in the layout display area based on the format information in association with the document data, a printed image of the document data cannot be grasped definitely with only the layout display. To print the document data on print paper of a particular size in well balanced condition, the operator may want to change the "top margin", "bottom margin" or "print line numbers". However, determination of the amounts of changes of those items is impossible for the operator, since the layout of the document is only displayed.

One solution for such problems is to make a memoranda of the format information of the document data prior to executing the layout function. However, this solution is involved with problems such that a troublesome preparatory procedure needs to be taken, and hence time is wasted because the format information needs to be displayed and the operator needs to make a memo each time the layout display is carried out.

SUMMARY OF THE INVENTION

It is an object of the present invention to provide a layout display control system for a document processing apparatus in which format information of document data is displayed together with the document data so that the user can readily recognize a print image of the document data.

According to the present invention, there is provided, as shown in FIG. 1 of the accompanying drawings, a layout display control system for a document processing apparatus which comprises input means for inputting document data of plural pages of documents and various command data including format information which determine a printing format of the documents; document data memory means for storing the document data inputted from the input means; format information memory means for storing the format information inputted from the input means, the format information being stored in association with the document data; display means for selectively displaying the document data and at least one layout display area; layout display mode selecting means for selecting a layout display mode; layout display control means for reading the document data from the document data memory means, converting the read document data into layout data, and displaying a layout of the document data in the layout display area, when the layout display mode is selected; and format information display control means for reading the format information in association with the read document data from the format information memory means and displaying the read format information into a region out of the layout display area, when the layout of the document data is displayed in the layout display area.

The format information may be inputted so as to be assigned equally to each page of each document. Alternatively, different types of format information may be inputted so as to be assigned to each page of each document.

In the document processing apparatus of the present invention, when the layout display mode is selected by the layout display mode selecting means for displaying the layout of the document data, the layout display control means reads the document data from the document data memory means, converts the document data to layout data, and then displays the layout of the document data on one part of the display on a page basis based on the format information read from the format information memory means. At this time, the format information display control means reads the associated format information from the format information memory and displays the information on another part of the display.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

An embodiment of the present invention will hereinafter be described with reference to the drawings. In this embodiment, the present invention is applied to an English word processor.

Figure 1:
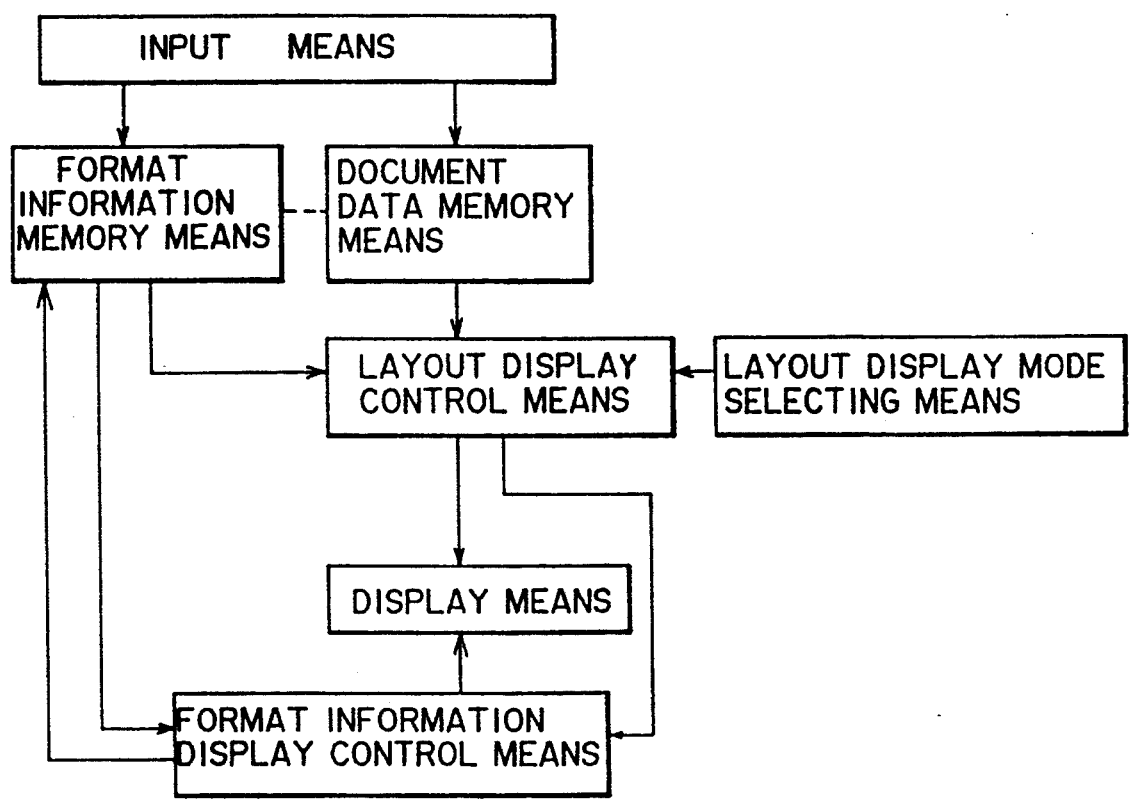
FIG. 1 is a functional block diagram of a layout display control system according to the present invention.
Figure 2:
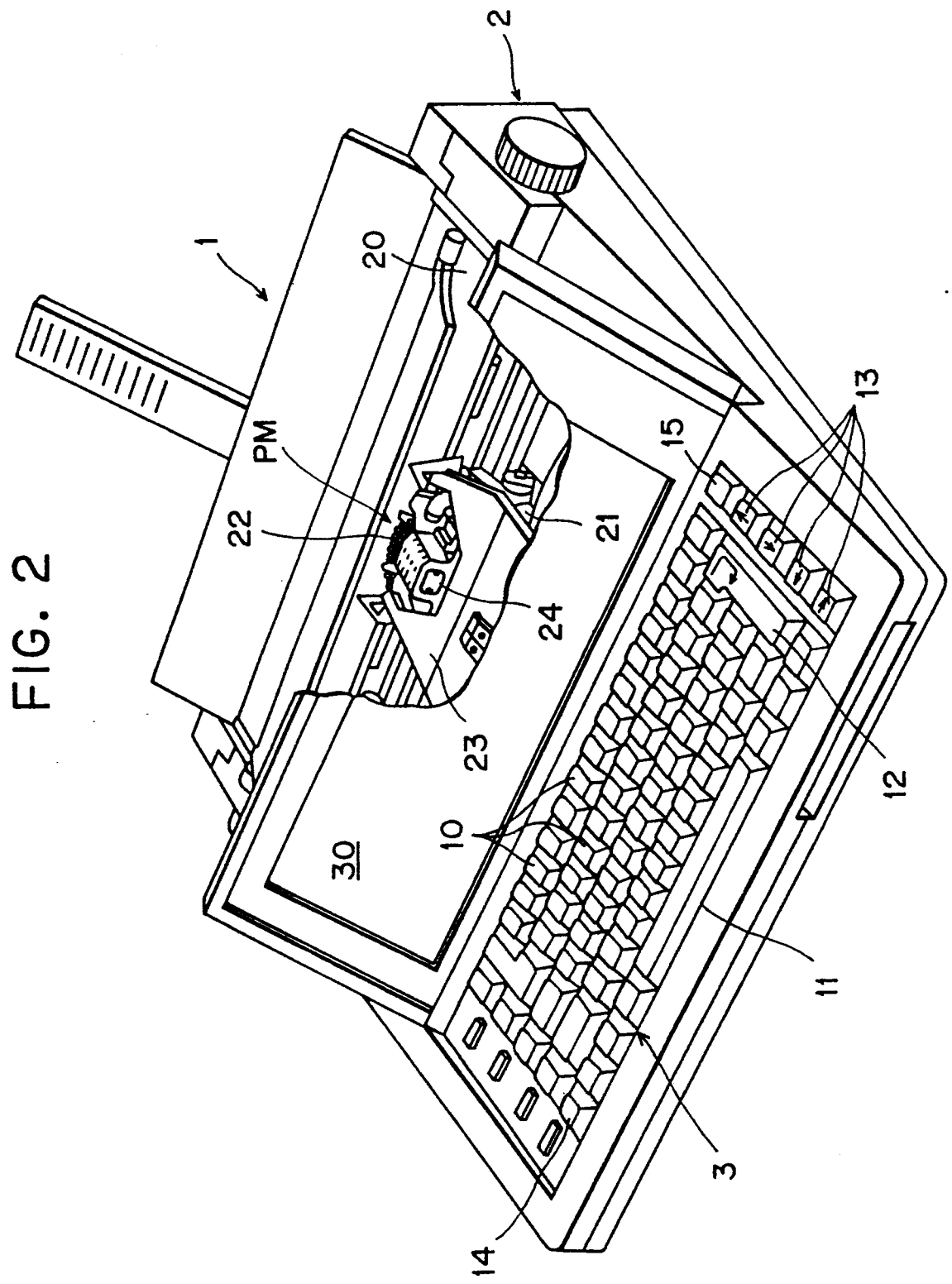
FIG. 2 is a perspective view of a word processor.

As shown in FIG. 2, a word processor 1 has a housing frame 2 supporting a keyboard 3 on a front portion thereof and housing a daisy-wheel printing mechanism PM behind the keyboard 3. The word processor 1 includes a liquid crystal display 30 capable of displaying fourteen lines of characters and symbols. The liquid crystal display 30 is positioned behind the keyboard 3 and is angularly movable between an operative position shown in FIG. 2 and a storage position.

The keyboard 3 comprises character keys 10 including alphabetical keys and numeral keys, a space key 11, a return key 12, cursor moving keys 13 for vertically and horizontally moving a cursor 60 on the display 30, a layout key 14 for selecting a layout display mode to display the layout of document data, a cancel key 15 for canceling the execution of various functions, and various other function keys.

The printing mechanism PM is of a general construction composed of a platen 20 for feeding a sheet of print paper, a carriage 21 movable laterally along the platen 20, a daisy type-wheel 22 having a plurality of type characters on the tip ends of radial spokes, a ribbon cassette 23 for storing an ink ribbon, and a hammer solenoid 24 for hitting the type characters of the daisy type-wheel 22.

Figure 3:
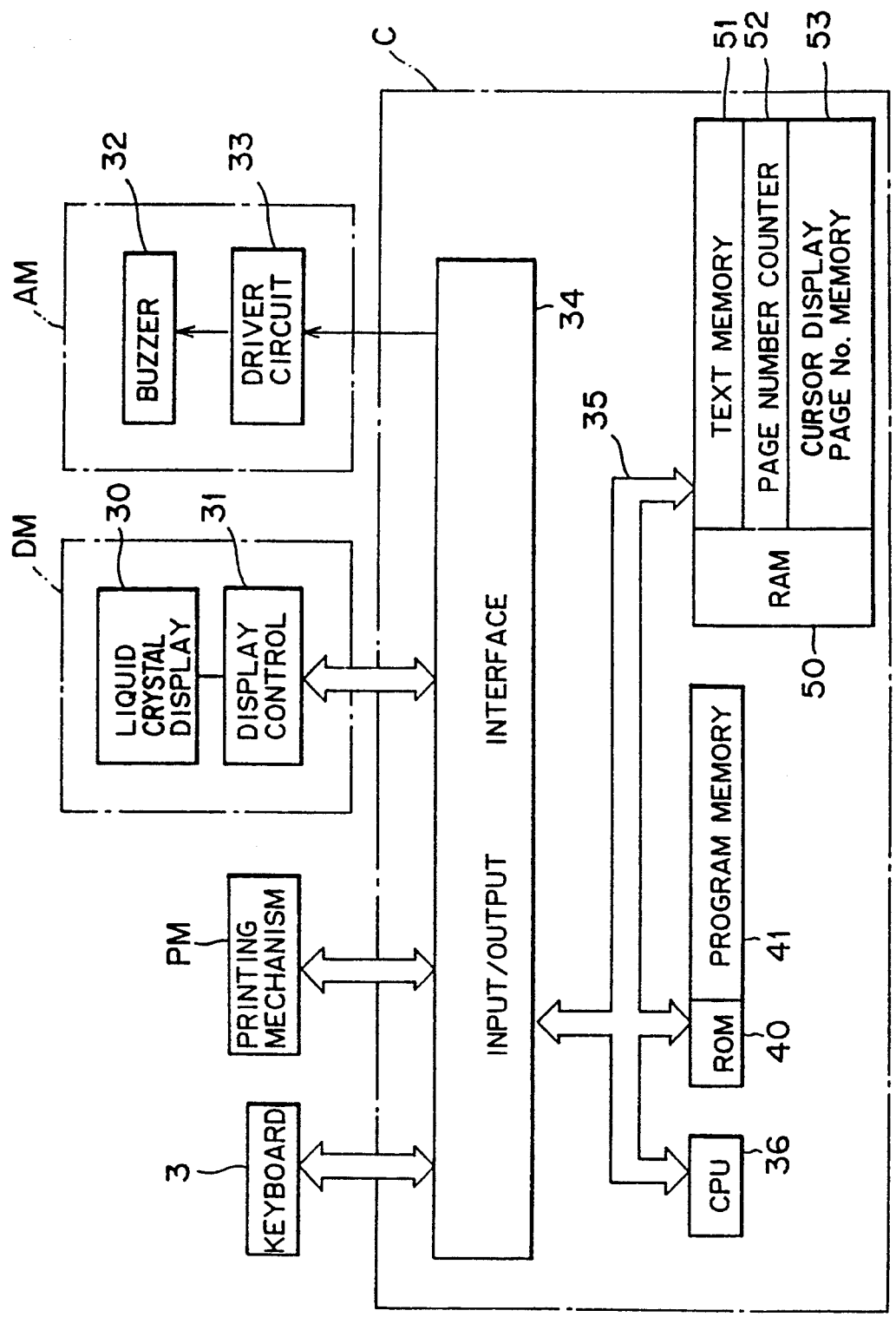
FIG. 3 is a block diagram of a control system of the word processor.

A control system of the word processor 1 will be described with reference to the block diagram of FIG. 3.

The word processor 1 basically comprises the keyboard 3, the printing mechanism PM, a display mechanism DM, an alarm mechanism AM, and a controller C. The keyboard 3, the printing mechanism PM, the display mechanism DM, and the alarm mechanism AM are electrically connected to an input/output interface 34 of the controller C.

The display mechanism DM has a general-structure including the liquid crystal display 30, and a display controller 31 including a display RAM for outputting display data and a character generator ROM which stores many dot patterns for characters and symbols.

The alarm mechanism AM comprises a buzzer 32 and a driver circuit 33 for energizing the buzzer 32.

The controller C comprises a CPU 36, the input/output interface 34 connected to the CPU 36 through a bus 35 such as a data bus, a ROM 40, and a RAM 50.

The ROM 40 includes a program memory 41 which stores a control program for controlling the printing mechanism PM and the display mechanism DM according to code data received from the keyboard 3, another control program to be executed when a layout display mode is selected for displaying a layout.

The control program for displaying a layout includes a subroutine for controlling the processing of the layout display and also includes an equation for determining a first display page number S:

$$S = [\text{an integer of } \{(I-1)/6\}] \times 6 + 1$$

where I is a page number count. The subroutine for controlling the processing of the layout display includes a conversion control subroutine for converting the arrangement of characters of read document data into an arrangement of dots.

The RAM 50 includes a text memory 51 for storing document data of a plurality of documents which are inputted, a page number counter (whose count is I) 52 for storing the page number in which the cursor 60 is positioned, among the document data displayed on the display 30, a cursor display page number memory 53 for storing the number M of a cursor display page in which the cursor 60 is displayed, among the display page numbers allotted to layout display areas E where the layouts of the pages are displayed, and various memories for temporarily storing the results of arithmetic operations carried out by the CPU 36.

Figure 4:
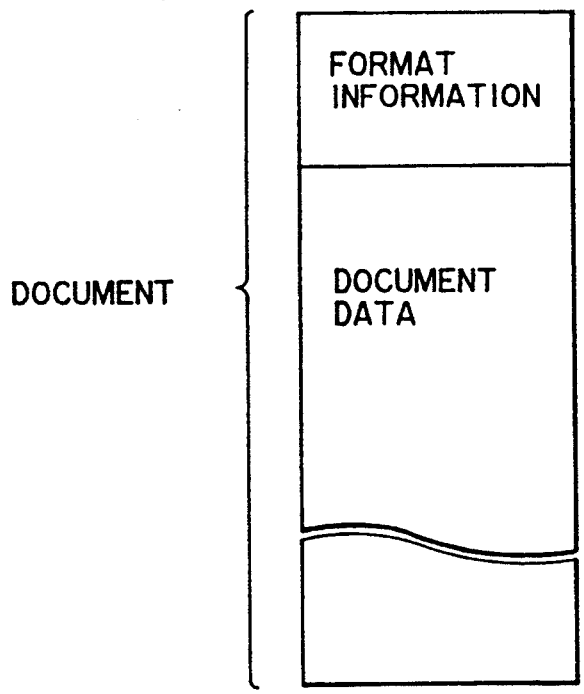
FIG. 4 is a diagram illustrative of the structure of a document stored in a text memory.

As shown in FIG. 4, each of the documents stored in the text memory 51 includes format information, in its leading portion, relative to a printing format that is inputted when document data are generated, and document data including margin codes established by left and right margin setting keys and positional data with respect to the positions where the margin codes are set.

The format information contains various items such as "top margin" defined by a space from the upper edge of a sheet of print paper to the print start position of the document data, "print line numbers" defined by the number of lines to be printed in each page, "bottom margin" defined by a space from the last printed position to the lower edge of the sheet of print paper, and a plurality of other line directional items. Each item is set by line numbers.

Figure 5:
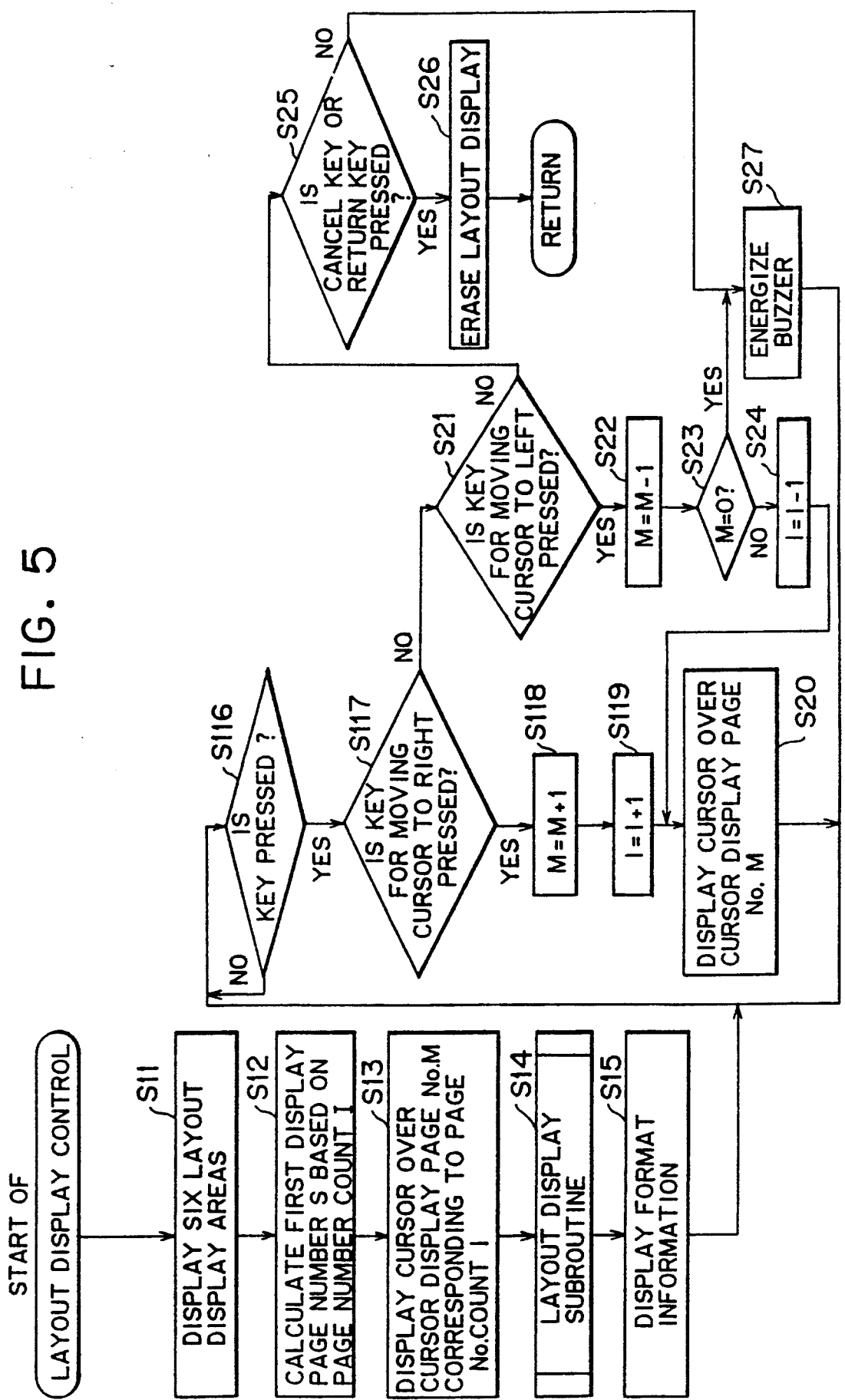
FIG. 5 is a flowchart for a layout display control routine.
Figure 7:
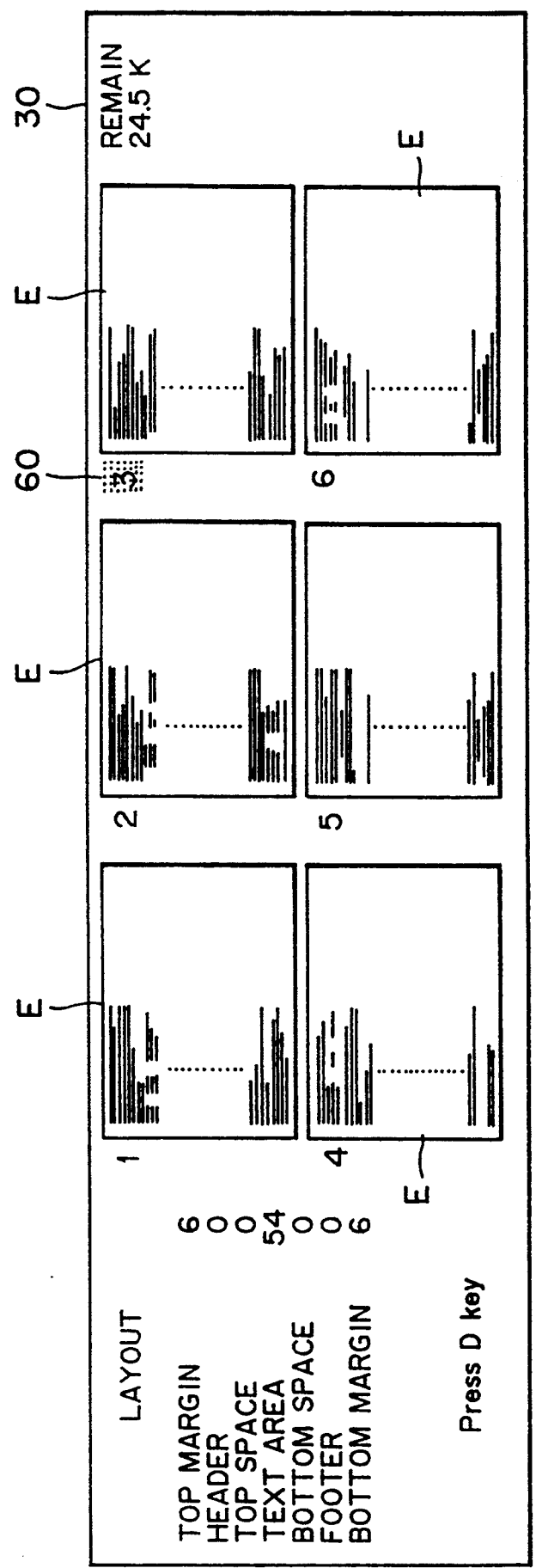
FIG. 7 is a diagram showing displayed layouts in a layout display mode.

A routine for controlling the display of a layout, which is executed by the controller C of the word processor 1, will be described below with reference to the flowchart shown in FIG. 5.

The flowchart includes steps denoted by Si (i=1, 2, 3 ...). Before the layout display control routine is executed, either desired document data stored in the text memory 51 are displayed on the display 30, or newly inputted document data are displayed on the display 30. The page number of a current page in which the cursor 60 is displayed is successively updated as the cursor is moved according to a cursor control program (not shown), and stored in the page number counter 52.

Figure 6:
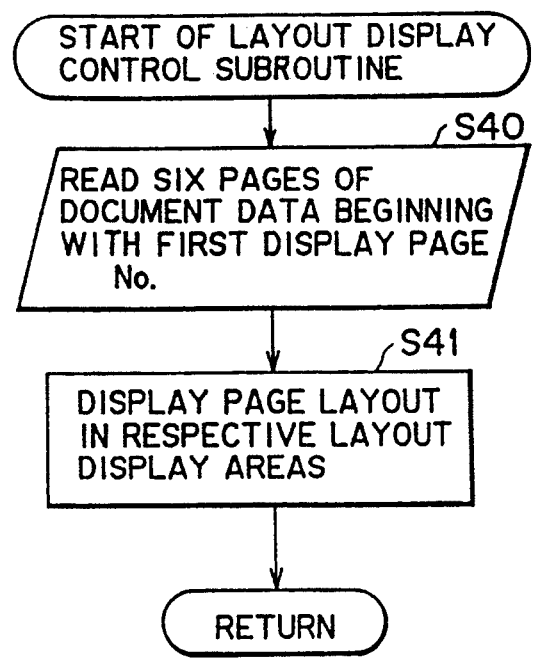
FIG. 6 is a flowchart for a layout display control subroutine.

When the layout display control routine is started in response to depression of the layout key 14, the display 30 displays six rectangular layout display areas E each having a horizontal length of 8.5 inches (85 letters/pica pitch) and a vertical length corresponding to the preset number of lines based on format information, in a step S11. Based on the page number count I, a first display page number S is calculated according to the above equation, and layout display area numbers beginning with the calculated first display page number S are displayed respectively in the six layout display areas E, in a step S12. The page number count I is stored as M in the cursor display page number memory 53, and the cursor 60 is displayed over the cursor display page number M in a step S13. Then, the layout display processing control is executed in a step S14, as shown in FIG. 6.

When the display processing control is started, six pages of document data, beginning with the first display page number S, are read on the basis of the data on the number of lines to be printed on every page, the number of lines contained in the format information, and also the line changing data contained in the document data, in a step S40. The layouts of the six pages, which contain the line arrangement of dots converted respectively from the character arrangement in the read six pages of document data, are displayed in the respective layout display areas E in a step S41. After the display processing control, the format information contained in the leading portion of the document data are read out and displayed in an area apart from the layout display areas E of the display 30, and the storage capacity of an empty area of the RAM 50 is also displayed in step S15. For example, if the layout key 14 is pushed when there are 10 pages of document data that are selected for layout display and the cursor 60 is positioned in the third page disposed on the display 30, then six pages of document data, ranging from the first page to the sixth page are displayed respectively in the six layout display areas E, with the cursor 60 being displayed over the layout display area number "3". The display 30 also displays, in its lefthand end area, format information including such items as "TOP MARGIN 6", "HEADER 0" for indicating whether there is a title to be printed on the first line in each page, "TOP SPACE 0" for indicating the distance between "HEADER" and "TEXT AREA", "TEXT AREA 54", "BOTTOM SPACE 0", "FOOTER 0", and "BOTTOM MARGIN 6". Hence, the user can recognize the contents of the format information being set on which the layout display is based while viewing the displayed layout, and therefore the user can definitely grasp the print image.

Furthermore, when the set values of the respective format information items are to be changed to improve the printing balance, the values to be newly set can be readily derived from the current values. In addition, a procedure for making a memoranda of the format information is not necessary prior to carrying out the layout display.

If the key 13 for moving the cursor to the right is pressed while the layouts of document data are being displayed in the layout display mode in a step S16 (Yes) and a S17 (Yes), both the cursor display page number M and the page number count value I are incremented by 1 in steps S18 and S19, and the cursor 60 is displayed over the cursor display page number M in step S20, after which control goes back to the step S16. If the key 13 for moving the cursor to the left is pressed in the step S16 (yes) and S21 (Yes), then the cursor display page number M is decremented by 1 in step S22. If the cursor display page number M is not "0" in a step S23 (No), then the count I is decremented by 1 in step S24, and control goes through the step S20 back to the step S16.

If the cancel key 15 or the return key 12 is pressed during the layout display mode in the step S16 (Yes) and step S25 (Yes), the display of all the layouts is canceled in step S26. Then, the control returns to the main routine and the page of document data indicated by the page number count I is displayed on the display 30. If any of the other keys than the keys 13 for moving the cursor to the right and the left, the cancel key 15, and the return key 12 is pressed in the step S25 (No), and if the cursor display page number M is "0" in the step S23 (Yes), then the buzzer 32 is energized in step S27, from which control returns to the step S16.

When the key 13 for moving the cursor downwardly or the key 13 for moving the cursor upwardly is pressed, the display 30 may display the layouts of pages associated with those layout display area numbers which are equal to the sums of, or the differences between, the presently displayed layout display area numbers and "3".

The number of layout display areas E which can be displayed is not limited to six but may be at least one.

Figure 8:
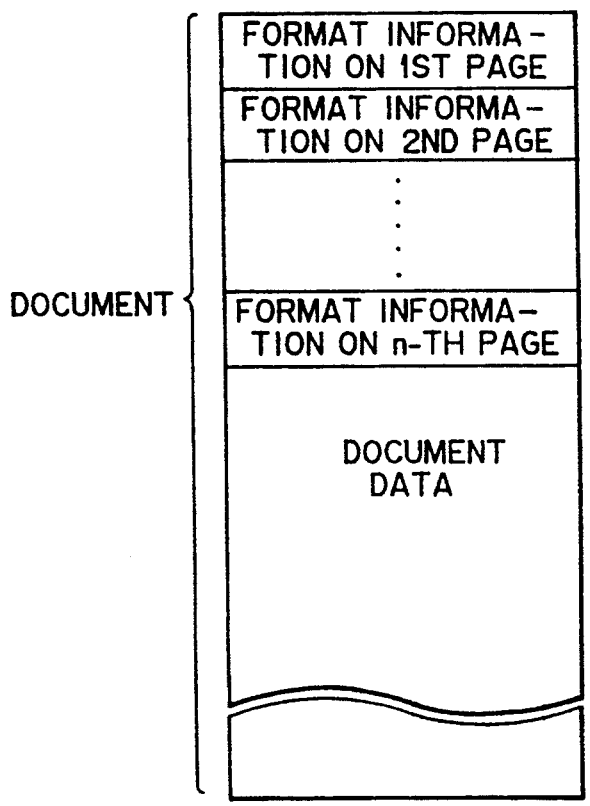
FIG. 8 is a diagram illustrative of a structure of a document stored in the text memory according to a modification of the present invention.
Figure 9:
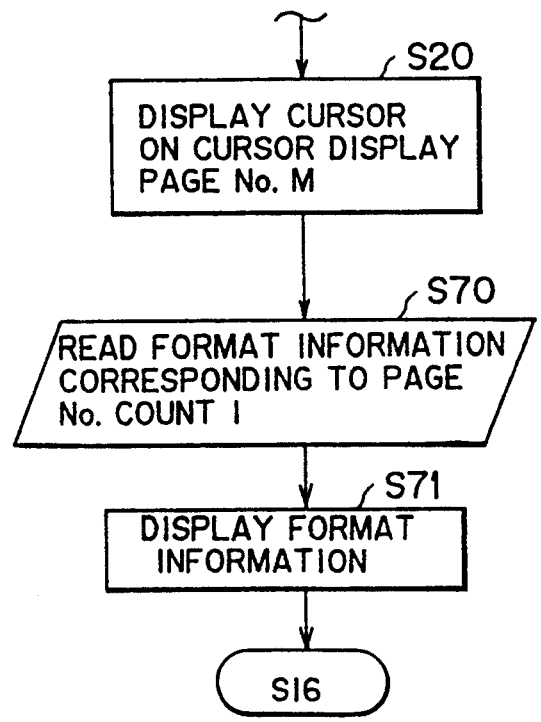
FIG. 9 is a flowchart for a layout display control routine according to the modification of the present invention.

As shown in FIG. 8, when a plurality of format information set on page basis are present in the leading portion of the document which is stored in the text memory 51, the routine of the above-described layout display control may be partially modified as shown in FIG. 9 by introducing steps S70 and S71 after the step S20, so that the format information corresponding to the page number count I is displayed. Other than the modification in this respect, the same routine as described above is available.

Specifically, when the cursor 60 is displayed on the cursor display page number M in the step S20, the format information corresponding to the count value of the page number counter 52 is read out from the plurality of format information stored in the leading portion of the document data in the step S70, and the format information being read out is displayed in the step S71, and then the control returns to the step S16. The advantages as mentioned above are also obtainable in this modification.

The ROM 40 may store a display page group table containing groups of the page numbers of six pages to be displayed together in the layout display mode, and the first display page numbers S of the respective groups. When the layout display mode is selected, the first display page number S may be determined from the display page group table based on the page number count I.

The principles of the present invention are also applicable to various document processing apparatus capable of displaying layouts, such as an European-language or Japanese word processor having a floppy disk drive for storing document data in a floppy disk.

What is claimed is:

1. A document processing apparatus, comprising:
    input means for inputting document data relating to plural pages of a document and various command data including format information which determine a printing format of the document;
    document data memory means for storing the document data inputted from said input means;
    format information memory means for storing the format information inputted from said input means, the format information being stored in association with the document data and comprising set values for specified formal items which are applied to each page of the document;
    display means for selectively displaying at least one page of the document data in a layout display area;
    layout display control means for reading the document data from said document data memory means, converting the document data read from the document data memory means into layout data, and displaying the layout data in the layout display area of said display means, said layout display control means converting an arrangement of characters in the at least one page into an arrangement of dots or lines;

layout display mode selecting means for selecting a layout display mode wherein said layout display control means displays the layout data in the layout display area;

format information display control means for reading the format information in association with the document data read from said format information memory means and displaying the format information in a region outside of the layout display area when the layout of the document data is displayed in the layout display area;

first designation means for designating one of the pages of the document from the document data displayed on said display means;

first registering means for storing a number corresponding to the page designated by said first designation means;

second registering means for initially storing the number stored in said first registering means; and second designation means for designating one of the layout display areas identified by the number stored in said second registering means, wherein a plurality of pages of the document are displayed on a plurality of layout display areas in the layout display mode and the pages to be displayed are determined based on the page number registered in said first registering means.

2. A document processing apparatus according to claim 1, wherein said format information display control means displays the format information regarding the page of the document designated by said second designation means.

3. A document processing apparatus according to claim 1, wherein the format information includes a plurality of format items including at least a top margin defined by a space from an upper edge of a sheet of print paper to a first print line, a bottom margin defined by a space from a last print line to a lower edge of the sheet of print paper, and print line numbers to be printable in the sheet of print paper.

4. A document processing apparatus according to claim 1, wherein said input means inputs document data for each of a plurality of documents.

5. The document processing apparatus according to claim 1, wherein the display of said layout data is a representation of at least one page of the document data showing how the at least one page will appear when printed.

6. The document processing apparatus according to claim 5, wherein the display of said layout data presents the appearance of up to six pages of document data.

7. A document processing apparatus comprising:
input means for inputting document data relating to plural pages of a document and various command data including format information which determine a printing format of the document;

document data memory means for storing the document data inputted from said input means;

format information memory means for storing the format information inputted from said input means, the format information being stored in association with the document data and comprising set values for specified format items which are applied to each page of the document;

display means for selectively displaying at least one page of the document data in a layout display area;

layout display control means for reading the document data from said document data memory means, converting the document data read from the document data memory means into layout data, and displaying the layout data in the layout display area of said display means, said layout display control means converting an arrangement of characters in the at least one page into an arrangement of dots or lines;

layout display mode selecting means for selecting a layout display mode wherein said layout display control means displays the layout data in the layout display area;

format information display control means for reading the format information in association with the document data read from said format information memory means and displaying the format information in a region outside of the layout display area when the layout of the document data is displayed in the layout display area;

first designation means for designating one of the pages of the document from the document data displayed on said display means;

first registering means for storing a number corresponding to the page designated by said first designation means, wherein a plurality of pages of the document are displayed on a plurality of layout display areas in the layout display mode and the pages to be displayed are determined based on the page number registered in said first registering means;

second registering means for storing the number stored in said first registering means; and second designation means for designating one of the layout display areas, wherein the numbers in said first and second registering means are changed in accordance with a change in the layout display area designated by said second designation means.

8. The document processing apparatus according to claim 7, wherein the displayed format information comprises set values for top margin, header, top space, text area, bottom space, footer, and bottom margin settings.

9. A document processing apparatus according to claim 7, wherein said format information display control means displays the format information regarding the page of the document designated by said second designation means.

10. A document processing apparatus, comprising:
input means for inputting document data relating to plural pages of a document and various command data including format information which determine a printing format of the document;

document data memory means for storing the document data inputted from said input means;

format information memory means for storing the format information inputted from said input means, the format information being stored in association with the document data and comprising set values for specified format items which are assigned to each page of the document;

display means for selectively displaying at least one page of the document data in a layout display area;

layout display control means for reading the document data from said document data memory means, converting the document data read from the document data memory means into layout data, and displaying the layout data in the layout display area of said display means, said layout display control means converting an arrangement of characters in the at least one page into an arrangement of dots or lines;

layout display mode selecting means for selecting a layout display mode wherein said layout display control means displays the layout data in the layout display area;

format information display control means for reading the format information in association with the document data read from said format information memory means and displaying the format information in a region outside of the layout display area when the layout of the document data is displayed in the layout display area;

first designation means for designating one of the pages of the document from the document data displayed on said display means; and first registering means for registering a number corresponding to the page designated by said first designation means;

second registering means for storing the number stored in said first registering means; and second designation means for designating one of the layout display areas identified by the number stored in said second registering means, wherein a plurality of pages of the documents are displayed on a plurality of layout display areas in the layout display mode and the pages to be displayed are determined based on the page number registered in said first registering means.

11. A document processing apparatus according to claim 10, wherein said format information display control means displays the format information regarding the page of the document designated by said second designation means.

12. A document processing apparatus comprising:

input means for inputting document data relating to plural pages of a document and various command data including format information which determine a printing format of the document;

document data memory means for storing the document data inputted from said input means;

format information memory means for storing the format information inputted from said input means, the format information being stored in association with the document data and comprising set values for specified format items which are assigned to each page of the document;

display means for selectively displaying at least one page of the document data in a layout display area;

layout display control means for reading the document data from said document data memory means, converting the document data read from the document data memory means into layout data, and displaying the layout data in the layout display area of said display means, said layout display control means converting an arrangement of characters in the at least one page into an arrangement of dots or lines;

layout display mode selecting means for selecting a layout display mode wherein said layout display control means displays the layout data in the layout display area;

format information display control means for reading the format information in association with the document data read from said format information memory means and displaying the format information in a region outside of the layout display area when the layout of the document data is displayed in the layout display area;

first designation means for designating one of the pages of the document from the document data displayed on said display means; and first registering means for registering a number corresponding to the page designated by said first designation means, wherein a plurality of pages of the documents are displayed on a plurality of layout display areas in the layout display mode and the pages to be displayed are determined based on the page number registered in said first registering means;

second registering means for storing the number registered in said first registering means; and second designation means for designating one of the layout display areas, wherein the numbers in said first and second registering means are changed in accordance with a change in the layout display area designated by said second designation means.

13. A document processing apparatus according to claim 12, wherein said format information display control means displays the format information regarding the page of the document designated by said second designation means.

* * * * *